US008130756B2

(12) United States Patent  (10) Patent No.: US 8,130,756 B2
Jorgensen et al.  (45) Date of Patent: Mar. 6, 2012

(54) TUNNEL CONFIGURATION ASSOCIATED WITH PACKET CHECKING IN A NETWORK

(75) Inventors: Steven G. Jorgensen, Newcastle, CA (US); Alan R. Albrecht, Granite Bay, CA (US); Bruce E. LaVigne, Roseville, CA (US); Mark Gooch, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 931 days.

(21) Appl. No.: 11/827,742

(22) Filed: Jul. 13, 2007

(65) Prior Publication Data

US 2009/0016337 A1  Jan. 15, 2009

(51) Int. Cl.
 *H04L 12/28* (2006.01)
(52) U.S. Cl. ........................................ 370/389; 370/392
(58) Field of Classification Search .................. 370/229, 370/252, 389, 392; 713/153
 See application file for complete search history.

(56) References Cited

U.S. PATENT DOCUMENTS

| | | | |
|---|---|---|---|
| 6,408,336 B1 * | 6/2002 | Schneider et al. ............ 709/229 |
| 6,763,018 B1 | 7/2004 | Puthiyandyil et al. |
| 7,103,045 B2 | 9/2006 | Lavigne et al. |
| 7,111,072 B1 | 9/2006 | Matthews et al. |
| 7,159,242 B2 | 1/2007 | Genty et al. |
| 7,209,479 B2 | 4/2007 | Larson |
| 7,366,894 B1 * | 4/2008 | Kalimuthu et al. ........... 713/153 |
| 7,447,901 B1 * | 11/2008 | Sullenberger et al. ........ 713/153 |
| 7,508,757 B2 * | 3/2009 | Ge et al. ........................ 370/229 |
| 2005/0063381 A1 * | 3/2005 | Kayalackakom et al. .... 370/389 |
| 2005/0114522 A1 | 5/2005 | LaVigne et al. |
| 2005/0220091 A1 | 10/2005 | LaVigne et al. |
| 2005/0220092 A1 | 10/2005 | LaVigne et al. |
| 2006/0215653 A1 | 9/2006 | LaVigne et al. |

\* cited by examiner

*Primary Examiner* — Dang Ton
*Assistant Examiner* — Brian O Connor

(57) ABSTRACT

A network, network devices, and methods are described for packet processing. A method includes using logic on a first network device to select a checking functionality based on a number of criteria. The method uses logic on the first network device to select the checking functionality from a list of checking functionalities. The checking functionality is selected for processing packets identified by the first network device. The method also includes using logic on the first network device to configure a tunnel initiation to tunnel packets to a second network device that is associated with the selected checking functionality. The second network device has a destination address different from an original destination address of identified packets.

17 Claims, 7 Drawing Sheets

| TUNNEL INGRESS TABLE 464 | | | | |
|---|---|---|---|---|
| 461 TUNNEL/CF NUMBER | 462 DESTINATION SWITCH IP ADDRESS | 463 WEIGHT OR COST METRIC | TRANSMITTED PACKET/BYTE COUNT | 465 SECURITY/AUTHENTICATION INFORMATION |
| 0 (CF-1) | IP-D1 | 50% | P0, b0 | KeyS0 |
| 1 (CF-2) | IP-D2 | 30% | P1, b1 | KeyS1 |
| ... | ... | ... | ... | ... |
| N (CF-N) | IP-DN | 20% | PN, bN | KeySN |

*Fig. 4A*

| 471 TUNNEL NUMBER | 472 SOURCING SWITCH IP ADDRESS | 473 RECEIVED PACKET/BYTE COUNT | DROPPED PACKET/BYTE COUNT | 475 SECURITY/AUTHENTICATION INFORMATION |
|---|---|---|---|---|
| 0 | IP-S1 | P0, b0 | PD0, BD0 | KeyS0 |
| 1 | IP-S2 | P1, b1 | PD1, BD1 | KeyS1 |
| ... | ... | ... | ... | ... |
| M | IP-SM | PM, bM | PDM, BDM | KeySM |

470 TUNNEL EGRESS TABLE 474

*Fig. 4B*

TUNNEL CONFIGURATION ASSOCIATED WITH PACKET CHECKING IN A NETWORK

BACKGROUND

Computing networks can include multiple network devices such as routers, switches, hubs, servers, desktop PCs, laptops, workstations, and peripheral devices, e.g., printers, facsimile devices, and scanners, networked together across a local area network (LAN) and/or wide area network (WAN).

One advantage realized by networks is the ability to share network resources among dispersed clients. For example, networks can include checking functionalities such as an intrusion system (IS), e.g., intrusion prevention system (IPS) and/or intrusion detection system (IDS) that serve to detect unwanted intrusions/activities to the computer network, as well as remediation servers that store operating system patches, virus definitions, etc. Unwanted network intrusions/activities may take the form of attacks through computer viruses and/or hackers, misconfigured devices among others, trying to access the network. To this end, an IS can identify different types of suspicious network traffic and network device usage that can not be detected by a conventional firewall. This includes network attacks against vulnerable services, data driven attacks on applications, host based attacks such as privilege escalation, denial of service attacks, port scans, unauthorized logins and access to sensitive files, viruses, Trojan horses, and worms, among others.

Tunnels, e.g., a virtual private network (VPN), can be used for transporting data between sites or within sites, e.g., sites of a company. Tunnels can be used to transport data across a third-party network, across insecure parts of a network, or across networks of dissimilar types, e.g., internet protocol versions four and six (IPv4 and IPv6). Tunnels can also be used in conjunction with shared network resources. For example, a site could have many clients attached to many switches, all needing tunneling to one of many checking functionalities on the network. In this case, the number of tunnels required for a network could be large and dynamic.

In previous approaches, tunnels between devices were configured using a manual process, which required a network administrator to connect to each device for setting up, i.e., configuring, or taking down, i.e., removing, a tunnel from the device configuration. Tunnel configuration required a good deal of user intervention, was both expensive to implement and very complex to maintain, and did not scale well as the number of devices having tunnel entry or exit points increased.

BRIEF DESCRIPTION OF THE DRAWINGS

FIG. 4A illustrates an example tunnel ingress table used to select the checking functionality to which identified packets should be sent according to embodiments of the present invention.

FIG. 4B illustrates an example tunnel egress table used to track which tunnels are terminating on a network device according to an embodiment of the present invention.

DETAILED DESCRIPTION

Embodiments of the present invention may include network devices, systems, and methods, including executable instructions and/or logic. In one embodiment of the present invention, a method includes using logic on a first network device to select a checking functionality based on a number of criteria. The method uses logic on the first network device to select the checking functionality from a list of checking functionalities. The checking functionality is selected for processing packets identified by the first network device. The method also includes using logic on the first network device to configure a tunnel initiation to tunnel packets to a second network device that is associated with the selected checking functionality. The second network device has a destination address different from an original destination address of identified packets. The second network device dynamically determines whether or not to accept the tunneled packets and can also set up the return tunnel back to the first network device, if this tunnel does not already exist.

Figure 1:
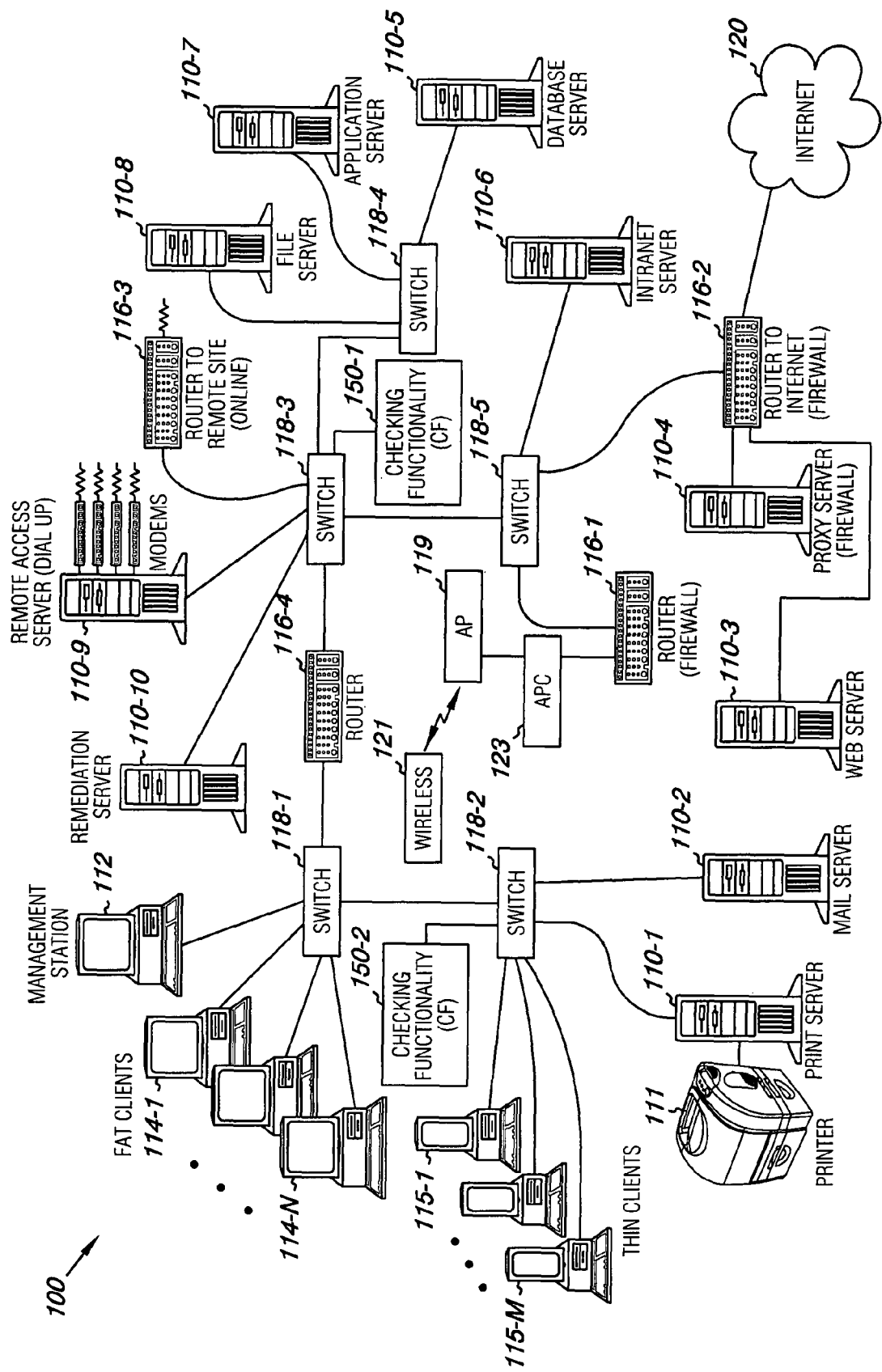
FIG. 1 illustrates an embodiment of a computing device network.

FIG. 1 illustrates an embodiment of a computing device network 100. As shown in FIG. 1, a number devices can be networked together in a LAN and/or WAN via routers, hubs, switches and the like. As used herein a "network device" means a switch, router, hub, bridge, etc., e.g., a device having processor and memory resources and connected to a network 100, as the same will be understood by one of ordinary skill in the art. Although the term switch will often be used herein, those skilled in the art will realize that embodiments may be implemented with other network devices. As the reader will appreciate, the term network device can also be used to refer to servers, PCs, etc., as illustrated further below.

The example network of FIG. 1 illustrates a print server 110-1 and printer 111 to handle print jobs for the network 100, a mail server 110-2, a web server 110-3, a proxy server (firewall) 110-4, a database server 110-5, an intranet server 110-6, an application server 110-7, a file server 110-8, and a remote access server 110-9; A server, database server 110-5 for example, could serve as a checking functionality (CF) server, storing the list of available CF's for the network (where a CF can be an IS, counting device, accounting device, remediation device, etc). The examples described here do not provide an exhaustive list of servers that may be used in a network.

The embodiment of FIG. 1 further illustrates a network management station 112, e.g., a server, PC and/or workstation, a number of "fat" clients 114-1, . . . , 114-N which can also include PCs and workstations and/or laptops, and a number of "thin" clients 115-1, . . . , 115-M. As used herein a "thin client" can refer to a computing device that performs little or no application processing and functions more as an input/output terminal. That is, in this example, a thin client generally relies on the application processing being performed on a server networked thereto. Additionally, a thin client can include a client in a server/client relationship which has little or no storage, as the same will be understood by one of ordinary skill in the art. In contrast, a "fat client" is generally equipped with processor and memory resources, to perform larger application processing and/or storage.

As used with respect to FIG. 1, the designators "N" and "M" indicate that a number of fat or thin clients can be attached to the network 100. The number that N represents can be the same or different from the number represented by M. The embodiment of FIG. 1, illustrates that all of these example network devices can be connected to one another and/or to other networks using routers, 116-1, 116-2, 116-3, and 116-4, and hubs and/or switches 118-1, 118-2, 118-3, 118-4, and 118-5. As noted above, such network devices can include a processor in communication with a memory and may include network chips having hardware logic, e.g., in the form of application specific integrated circuits (ASICs), associated with the number of network ports. The term "network" as used herein is not limited to the number, type, and/or configuration of network devices illustrated in FIG. 1.

As one of ordinary skill in the art will appreciate, many of the network devices (e.g., switches 118-1, 118-2, 118-3, 118-4, 118-5 and/or hubs) can include a processor in communication with a memory and will include network chips having logic, e.g., application specific integrated circuits (ASICs), and a number of network ports associated with such logic. By way of example and not by way of limitation, the network management station 112 includes a processor and memory. Embodiments of the various devices in the network are not limited to a number of ports, network chips and/or the type or size of processor or memory resources.

Additionally as the reader will appreciate, a number of mobile devices, e.g., wireless device 121, can connect to the network 100 via a wireless air interface (e.g., 802.11) which can provide a signal link between the mobile device 121 and an access point (AP) 119. The AP 119 serves a similar role to the base station in a wireless network, as the same will be known and understood by one of ordinary skill in the art. As shown in FIG. 1, the AP 119 can be linked to an access point controller (APC) 123, as the same will known and understood by one of ordinary skill in the art, which connects the AP 119 over a packet switched signal link, e.g. an Ethernet link, to other network devices, e.g., router 116-1.

As one of ordinary skill in the art will appreciate, each network device in the network 100 can be physically associated with a port of a switch to which it is connected. Information in the form of packets can be passed through the network 100. Users physically connect to the network through ports on the network 100. Data frames, or packets, can be transferred between network devices by means of a network device's, e.g., switch's, logic link control (LLC)/media access control (MAC) circuitry, or "engines", as associated with ports on a network device. A network switch forwards packets received from a transmitting network device to a destination network device based on the header information in received packets. A network device can also forward packets from a given network to other networks through ports on one or more other network devices. As the reader will appreciate an Ethernet network is described herein. However, embodiments are not limited to use in an Ethernet network, and may be equally well suited to other network types, e.g., asynchronous transfer mode (ATM) networks, etc.

As used herein, the term "network appliance" is used to mean an add-on device, e.g., "plug-in" or "application module," to a network as contrasted with a "network device", e.g., router, switch, and/or hub, etc., which are sometimes considered more as "backbone" component devices to a network. As the reader will appreciate, a network appliance, e.g., checking functionality 150-1 or 150-2, can include processor and memory resources capable of storing and executing instructions to perform a particular role or function. A network appliance can also include one or more network chips, e.g., ASICs, having logic and a number of ports, as the same will be known and understood by one of ordinary skill in the art.

In the example network implementation of FIG. 1, a checking functionality (CF) 150-1 is shown in association with switch 118-3, and a CF 150-2 is shown in association with switch 118-2. In certain embodiments, the checking functionality performed by a network appliance, e.g. checking functionality 150-1 or 150-2, can perform the role of an intrusion prevention system (IPS), as may be supplied by a third party vendor of network security devices. In certain embodiments, the checking functionality 150-1 or 150-2 can perform the role of an intrusion detection system (IDS), or another diagnostic device, accounting device, counting device, etc., as may be supplied by a third party vendor. Additionally, a CF may be associated with a remediation server and use a remediation Virtual Local Area Network (VLAN), as is described in more detail in co-pending, commonly assigned U.S. patent application Ser. No. 11/796,973, entitled "Remote Client Remediation," and having at least one common inventor, filed Apr. 30, 2007. The same is not described more fully herein so as not to obscure embodiments of the present invention. Embodiments are not limited to the examples given here.

As used herein, a network can provide a communication system that links two or more computers and peripheral devices, allows users to access resources on other computers, and exchange messages with other users. A network allows users to share resources on their own systems with other network users and to access information on centrally located systems or systems that are located at remote offices. It may provide connections to the Internet or to the networks of other organizations. Users may interact with network-enabled software applications to make a network request, such as to get a file or print on a network printer. Applications may also communicate with network management software, which can interact with network hardware to transmit information between devices on the network.

Figure 2:
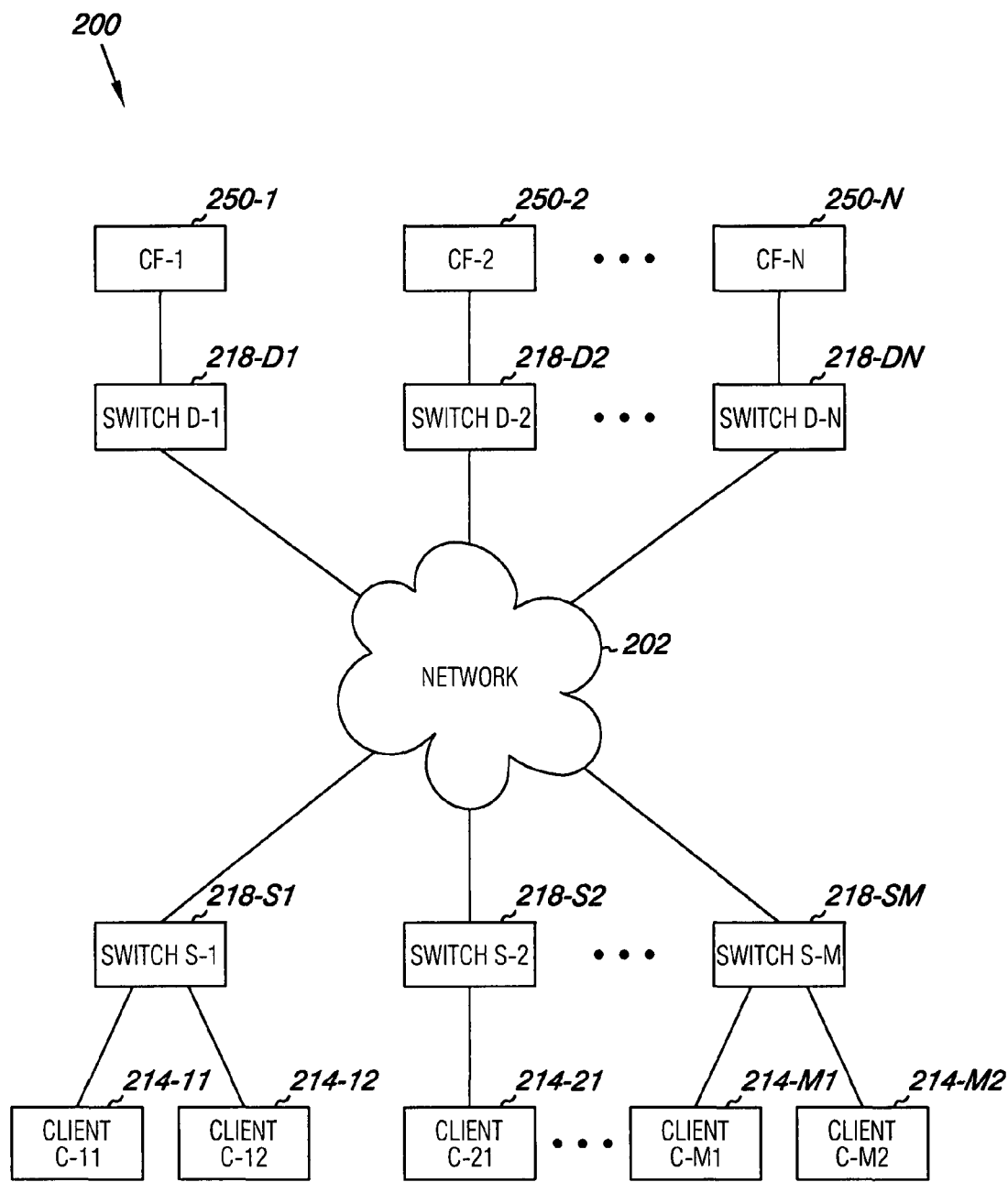
FIG. 2 is a block diagram illustrating a portion of a network, such as shown in FIG. 1, having network devices which can implement embodiments of the present invention.

FIG. 2 is a block diagram illustrating a portion 200 of a network, such as shown in FIG. 1, having network devices 218-S1, 218-S2, . . . , 218-SM, and 218-D1, 218-D2, . . . , 218-DN, e.g., switches, which can implement embodiments of the present invention.

Although reference is often made herein to switches, those skilled in the art will realize that embodiments of the invention may be implemented in other network devices. Examples of other network devices include, but are not limited to, wireless and/or wired routers, switches, hubs, bridges, etc., e.g., intelligent network devices having processor and memory resources.

The source, e.g., "first," switches 218-S1, 218-S2, . . . , 218-SM are each connected to a number of clients, 214-11, 214-12, . . . , 214-21, . . . , 214-M1, 214-M2. The switches 218-S1, 218-S2, . . . , 218-SM are also connected to a network 202 such as network 100 shown in FIG. 1. Destination, e.g., "second," switches 218-D1, 218-D2, . . . , 218-DN are each connected to a checking functionality (CF) 250-1, 250-2, . . . , 250-N. The destination switches 218-D1, 218-D2, . . . , 218-DN are also connected to the network 202 linking them to the source switches. As used with respect to FIG. 2, the designators "N" and "M" illustrate that various networks can have various numbers of clients and network devices, e.g., switches.

A client, such as client 214-11 could send network traffic, e.g., packets, through switch 218-S1. As described in more detail in connection with FIG. 3, switch 218-S1 can have logic to identify packets for tunneling to a checking functionality. In the embodiment illustrated in FIG. 2, logic on switch 218-S1 can select a checking functionality, e.g., 250-2, from a list, such as that illustrated in tunnel ingress table 460 in FIG. 4A. Once switch 218-S1 selects a checking functionality, it encapsulates and tunnels all identified packets from client 214-11 through the network 202 to the network device, e.g. 218-D2, that is associated with the selected checking functionality 250-2.

A network device, e.g. source switch 218-S1, can select a CF, e.g. CF-2, 250-2, based on a number of criteria. In some embodiments, each available CF could be given a weight to control how much traffic it should be sent. For example, as shown in FIG. 4A, CF-1, 250-1 could be weighted at 50%, CF-2, 250-2 at 30%, and CF-N, 250-N at 20%. Appropriate weights can be determined based on the processing capacity of the CF, the network distance between a switch and the CF, how much traffic has already been allocated to the CF, among other factors. "Network distance" takes into account more than just physical distance. Network distance can also include link speeds and latencies, among other attributes.

When a network device, e.g., switch 218-D2 receives the packets tunneled from switch 218-S1, logic on the switch 218-D2 may determine whether to configure a tunnel termination and accept tunneled packets. If the packets are accepted, switch 218-D2 can decapsulate the packets and forward them to a CF, e.g., 250-2 for processing.

As is illustrated in FIG. 2, a number of clients, e.g., 214-11 and 214-12 can be connected to a given network device, e.g., switch 218-S1. Furthermore, a switch 218-S1 can tunnel packets from multiple clients, 214-11 and 214-12, to one or more particular CFs, e.g. CF 250-1 via one or more second network devices, e.g., switch 218-D1.

In previous approaches, tunnels were manually configured by an administrator who was required to log in to a network device on each end of a tunnel, e.g., switches 218-S1, 218-S2, . . . , 218-SM, and 218-D1, 218-D2, . . . , 218-DN, to set up each tunnel. The administrator was required to enter the IP addresses of the destination device, the tunnel format, security policies, as well as additional information known by those skilled in the art for setting up tunnels. Embodiments of the present invention, in contrast, allow tunnels to be configured and removed without manual intervention from an administrator.

A checking functionality can be performed by a network appliance separate from a network device, e.g., CF 150-2 in FIG. 1. Alternatively, a network device, e.g., switch 218-D1 in FIG. 2 can have a checking functionality integrated onboard the network device.

Although reference is made herein to a "first", e.g., "source," network device and a "second", e.g., "destination," network device, either network device could perform the functions of source and destination network devices as described herein. The terms "first" or "source" and "second" or "destination" are used merely to aid in understanding the various functions of network devices as they perform operations according to embodiments described herein.

As the reader will appreciate, a network device that is either connected to a CF, or has a CF integrated onboard the network device, e.g. a destination network device, could also receive packets from a client and configure a tunnel initiation to tunnel identified packets to a different network device. As stated above, a given network device can perform the operations of either a "first" or "second" network device.

Figure 3:
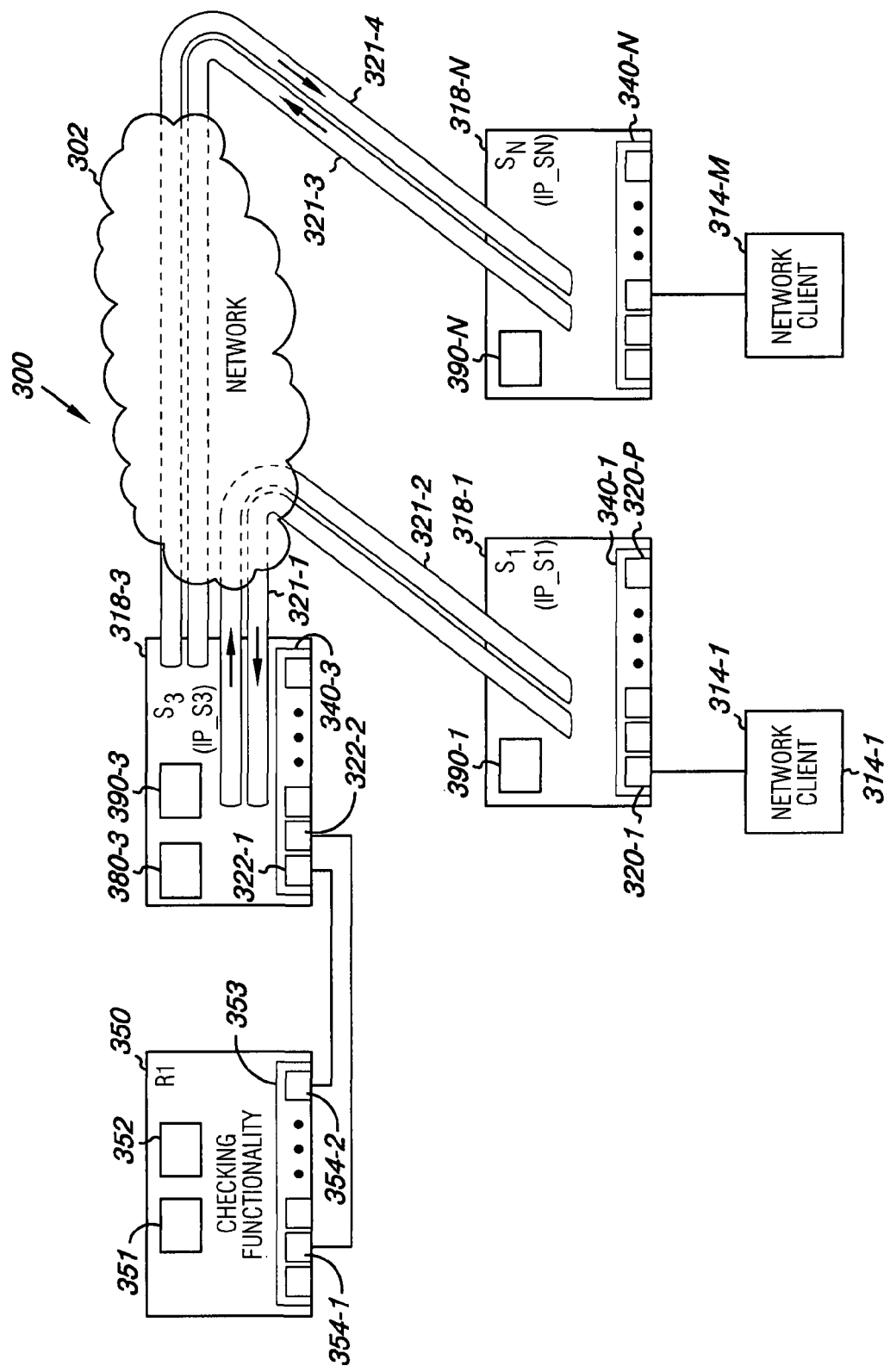
FIG. 3 illustrates a portion of a network, such as shown in FIG. 1, including network devices suited to implement embodiments of the present invention.

FIG. 3 illustrates a portion 300 of a network, e.g., network 100 shown in FIG. 1, including network devices, 318-1, 318-3, . . . 318-N suited to implement embodiments of the present invention. Certain devices are referred to as "source" network devices and other network devices are referred to as "destination" network devices. As used herein, "source" network devices means network devices, e.g., 318-1, having ports connected directly to network clients, 314-1, . . . 314-M. The network clients can include servers, "fat" and "thin" clients, including mobile network clients connected through an APC, etc., as discussed above in connection with FIG. 1. As used herein, "destination" network devices means network devices, e.g., 318-3, which are associated with checking functionalities (CFs), e.g., CF 350. Destination network devices can be associated with an external CF, as shown at 350, or can have a CF integrated onboard the network device, as shown at 380-3.

As described in connection with FIG. 1, the various network devices, 318-1, 318-3, . . . 318-N, can include switches, routers, hubs, etc. (shown as switches in FIG. 3). Such network devices, 318-1, 318-3, . . . 318-N, can include processor(s), and memory resources. The network devices, 318-1, 318-3, . . . 318-N, can similarly include a number of network chips, e.g., 340-1, 340-3, . . . , 340-N, including logic circuitry (hardware) which can execute instructions and/or logic and each network chip, 340-1, . . . , 340-N, can include a number of network ports, 320-1, . . . , 320-P, and 322-1, 322-2, to send and receive packets (network traffic) throughout the network 302. As mentioned above, the logic circuitry of the number of network chips, e.g., 340-1, . . . , 340-N, can be in the form of an application specific integrated circuit (ASIC) and include logic to serve as a media access controller (MAC).

As shown in FIG. 3, a number of ports 320-1, . . . , 320-P can be included on a network chip 340-1, . . . , 340-N and have access to logic circuitry associated with a network chip 340-1, . . . , 340-N and to the processor and memory. As used with respect to FIG. 3, the designators "N" and "P" are used to illustrate that various networks can have a various number of network devices, various numbers of network clients, and various network devices in a network may support or contain a various and/or different number of ports. Embodiments are not limited to the example shown in FIG. 3.

As shown in the embodiment of FIG. 3, a CF 350 can be connected to a network device, e.g., 318-3, which may be a destination network device. The CF 350 could also be provided as part of one or more switches, e.g., 318-3 at 380-3. As shown in FIG. 3, the CF 350 can include processor 351 and memory 352 resources capable of storing and executing instructions to perform a particular role or function. The CF can also include one or more chips (ASICs), e.g., 353, having logic and a number of ports, e.g., 354-1 and 354-2, as the same have been described above.

In various embodiments, the CF 350 is an intrusion prevention system (IPS), as may be supplied by a third party vendor of network security devices. In various embodiments, the CF 350 can be an intrusion detections system (IDS), another diagnostic device, an accounting device, a counting device, etc., as may be supplied by a third party vendor. Additionally, a CF may be a remediation server associated with a remediation VLAN, as noted above. Embodiments are not limited to the examples given here. Further, the various operations of such devices will be recognized and understood by one of ordinary skill in the art.

In the embodiment of FIG. 3, a packet is received from a port, e.g., 320-1, on a network device, e.g., switch 318-1, from a network client, e.g., 314-1. According to various embodiments, logic on the switch 318-1, e.g., logic associated with the hardware of the network chip 340-1, can identify original packets, which are received from or destined to a particular port, e.g., 320-1, on the device 318-1.

In some embodiments, logic can identify packets to send to a CF, e.g., 350, for security reasons, among others. One example of logic to identify packets to send to a CF, e.g., 350, is described in co-pending, commonly assigned U.S. patent application Ser. No. 11/712,706, entitled "Packet Tunneling," and having at least one common inventor, filed Mar. 1, 2007. The same is not described more fully herein so as not to obscure embodiments of the present invention.

In various embodiments, the logic selects a CF, e.g., 350, and then automatically configures a tunnel, e.g., tunnel 321-1, through a network 302, to a second network device, e.g., 318-3, connected to the CF 350 for tunneling. The CF 350 can be selected from a list, 390-1, 390-N, also tables 460 in FIG. 4A, of available CFs. The list of available CFs can include the network addresses of the CFs. The network addresses can be internet protocol (IP) addresses, among others. Destination network devices have a list, 390-3, table 470 in FIG. 4B, of source network devices, among other information.

According to various embodiments, the identified packets are tunnel encapsulated to tunnel the identified packets to a second network device, which may be a destination network device, e.g., switch (S3) 318-3, having a location different (e.g., remote) from an original MAC destination address of the identified packets. That is, the identified packets are sent via a tunnel to the second network device, e.g., 318-3, rather than forwarding the selected packets to their original MAC destination address. As the reader will appreciate, the tunnel may be a secure tunnel.

One example for tracking of the source switch, 318-1, and the setup of the return path, e.g., 321-2 or 321-4, for the packets by the destination switch, 318-3, is described in co-pending, commonly assigned U.S. patent application Ser. No. 11/788,179, entitled "Marked Packet Forwarding," by the same inventors, filed Apr. 19, 2007. The same is not described more fully herein so as not to obscure embodiments of the present invention.

FIG. 4A illustrates an example tunnel ingress table 460 used to select a checking functionality (CF) to which identified packets should be sent according to embodiments of the present invention. That is, table 460 is populated with information used by logic of the first network device, e.g. source switch S-1 218-S1, from FIG. 2 to select a CF to which identified packets should be sent, among other uses. The logic of the first network device uses table 460 to configure and maintain tunnels to one or more second network devices associated with one or more selected CFs.

In some embodiments, the logic can select a CF from the list in the order of the list such that it matches packets from a first client with a first CF, packets from a second client with a second CF, etc. Logic on the network device cycles through the order, sequentially selecting a CF for packets tunneled from successive clients. Once a CF has been selected for a given client, all packets from that client that are selected for tunneling are tunneled to the same CF. A CF can function more effectively when all packets that are part of the same flow are checked by the same CF.

In various embodiments, the logic can select a CF based on traffic levels for each CF. Appropriate traffic levels for each CF can be determined based on the processing capacity of the CF, the network distance between a switch and the CF, how much traffic has already been allocated to the CF, among other means. As used here, "network distance" takes into account more than just physical distance. Network distance can also include link speeds and latency. For example, it can be advantageous to use high bandwidth, low latency links, even if the physical distance is longer.

The table 460 includes column 461 "TUNNEUCF NUMBER" for indicating available checking functionalities and an associated tunnel number. Column 462 "SWITCH IP ADDRESS" indicates the destination address of the network device associated with a given CF. Column 463 "WEIGHT OR COST METRIC" indicates the assigned percentage of network traffic, or packets, that should be tunneled to each checking functionality. Column 464 "TRANSMITTED PACKET/BYTE COUNT" indicates the numbers of packets and bytes, tunneled to each CF. Column 465 "SECURITY/AUTHENTICATION INFORMATION" indicates security information which can be used to generate authentication or encryption information according to one or more embodiments of the present invention.

In the embodiment illustrated in FIG. 4A, Column 461 indicates that there are at least three possible CFs available. By way of example, and not by way of limitation, tunnel number 0 may be associated with CF-1, e.g., 250-1 in FIG. 2. Tunnel number 1 may be associated with CF-2, e.g., 250-2 in FIG. 2. Tunnel number N may be associated with CF-N, e.g., 250-N in FIG. 2. However, the designator "N" is intended to represent that a number of different CFs may be available. In various embodiments, the number of available CFs may be fewer or greater than three. The embodiment illustrated here is not intended to limit the number of network elements.

Column 462 indicates the IP addresses of second network devices associated with each CF. For example, IP-D1 may be associated with the IP address for destination switch D1 218-1 in FIG. 2. IP-D2 may be associated with the IP address for destination switch D2 218-D2 in FIG. 2. IP-DN may be associated with the IP address for destination switch D-N 218-DN in FIG. 2.

Column 463 indicates the percentages of network traffic allocated for each checking functionality. In the example embodiment illustrated in FIG. 4A, CF-1 is to receive 50% of the traffic, CF-2 is to receive 30% of the traffic, and CF-N is to receive 20% of the traffic. Again, the embodiments illustrated here are not limited to these examples. Other network traffic allocations are possible and will be understood and practiced by those of skill in the art according to the present invention.

Column 464 indicates the number of packets and bytes, e.g., P0, b0, tunneled to each checking functionality. In this example embodiment, P0 may be associated with the number of packets tunneled to CF-1, and b0 may be associated with the number of bytes tunneled to the same checking functionality. P1 may be associated with the number of packets tunneled to CF-2, and b1 may be associated with the number of bytes tunneled to the same checking functionality. PN may be associated with the number of packets tunneled to CF-N, and bN may be associated with the number of bytes tunneled to the same checking functionality. This information can be used along with the weight or cost metric as one method of determining to which CF a particular client's traffic should be sent.

Column 465 indicates stored security and authentication information for one or more checking functionalities. For example, KeyS0 may be associated with security information for CF-1. KeyS1 may be associated with security information for CF-2. KeySN may be associated with security information for CF-N.

In some embodiments, the tunnels can be secure tunnels. For example, a tunnel could include authentication to allow the destination network device to check that a tunneled packet truly did come from the source network device specified in the packet. Another example includes full encryption, which would fully protect the packet being tunneled from any snooping by others as it crosses the network.

In addition, there is no limitation on the number of tunnels that can be directed to any single destination switch (or checking functionality) from a single source switch. For example, two or more tunnel numbers may have identical destination switch IP addresses 462 but different security/authentication information 465. This allows tunneled traffic to be given different levels of security protection or sent via different network paths, for example.

FIG. 4B illustrates an example tunnel egress table 470 used to track which tunnels have a configured tunnel termination in association with a particular network device according to an embodiment of the present invention. That is, table 470 is populated with information used by logic of the second network device, e.g. destination switch D-2 218-D2 from FIG. 2, to detect when a particular tunnel is idle, among other uses.

The table 470 includes column 471 "TUNNEL NUMBER" for indicating a tunnel number for each tunnel that terminates on the network device, i.e., the egress tunnel point. Column 472 "SOURCING SWITCH IP ADDRESS" indicates the source address of the network device that transmitted the tunneled packets. Column 473 "RECEIVED PACKET BYTE COUNT" indicates the numbers of packets and bytes received by the destination switch in association with a particular tunnel. Column 474 "DROPPED PACKET/BYTE COUNT" indicates the numbers of packets and bytes, e.g., PD0, bD0, dropped by the destination switch, e.g., 218-D1 in FIG. 2. Column 475 "SECURITY/AUTHENTICATION INFORMATION" indicates security information which can be used to verify the authenticity of the tunnel and decrypt the tunneled packets according to an embodiment of the present invention.

In the embodiment illustrated in FIG. 4B, Column 471 indicates that there are at least three tunnels available, and Column 472 indicates the corresponding source address. In the embodiment illustrated in FIG. 4B, tunnel number 0 is associated with a particular source switch having IP address IP-S1, e.g., 218-S1 in FIG. 2. Tunnel number 1 is associated with a particular source switch having IP address IP-S2, e.g., 218-S2 in FIG. 2. Tunnel number M is associated with a particular source switch having IP address IP-SM, e.g., 218-SM in FIG. 2. However, the designator "M" is intended to represent that a number of different tunnels may be available. In various embodiments, the number of available tunnels and/or source network devices may be fewer or greater than three. The embodiment illustrated here is not intended to limit the number of network elements. As the reader will appreciate, there does not have to be a direct association between the tunnel numbers illustrated as examples in FIGS. 4A and 4B.

Column 473 indicates the numbers of packets and bytes, e.g., P0, b0, received by a given destination switch. In this example embodiment, P0 may be associated with the number of packets received from a tunnel number 0, and b0 may be associated with the number of bytes received from the same tunnel. P1 may be associated with the number of packets received from a tunnel number 1, and b1 may be associated with the number of bytes received from the same tunnel. PM may be associated with the number of packets received from a tunnel number M, and bM may be associated with the number of bytes received from the same tunnel.

Column 474 indicates the number of packets and bytes, e.g., PD0, BD0, dropped by a given destination switch. In this example embodiment, PD0 may be associated with the number of packets dropped from a tunnel number 0, and b0 may be associated with the number of bytes dropped from the same tunnel. PD1 may be associated with the number of packets dropped from a tunnel number 1, and b1 may be associated with the number of bytes dropped from the same tunnel. PDM may be associated with the number of packets dropped from a tunnel number M, and BDM may be associated with the number of bytes dropped from the same tunnel.

Column 475 indicates security information that can be used to verify the authenticity of a given tunnel and decrypt tunneled packets. For example, KeyS0 may be associated with security information for a tunnel number 0. KeyS1 may be associated with security information for a tunnel number 1. KeySM may be associated with security information for a tunnel number M.

The tables illustrated in FIGS. 4A and 4B exist for each network device, i.e., both for source switches and destination switches. Destination network devices are capable of return-tunneling packets to a source network device. Likewise, source network devices are capable of receiving packets return-tunneled from destination network devices.

A source network device receiving return-tunneled packets would have a tunnel egress table, like the one illustrated in FIG. 4B, for handling return-tunneled packets. For such a first (source) network device, the "SOURCING SWITCH IP ADDRESS" 472 would correspond to the second (destination) network device from which the packets were return tunneled. For example, if destination switch D2, 218-D2 in FIG. 2, return-tunneled packets to source switch S1, 218-S1 in FIG. 2, source switch S1's tunnel egress table would include IP-D2 as the "SOURCING SWITCH IP ADDRESS" 472.

A destination network device return-tunneling packets to a source network device would have a tunnel ingress table, like the one illustrated in FIG. 4A. For such a second (destination) network device, the "TUNNEL/IS NUMBER" 461 would include only a tunnel number, as a checking functionality number is irrelevant to return-tunneled packets. Furthermore, the table would not include a "WEIGHT OR COST METRIC" 463, because balancing is irrelevant to a return tunnel as there is only one correct return tunnel to an original sourcing network device.

In one embodiment, instructions and/or logic on the second network device can determine whether to accept a received tunnel from the first network device based on a number of conditions. Conditions may include the availability of resources, e.g., the network device may be limited to N number of tunnels, in which case tunnel N+1 would be rejected, as could be determined from information in column 471. Additional conditions could include the security of the tunnel, e.g., if the tunnel fails security or authorization checks, then the network device could reject it, as could be determined from information in column 475. Other conditions for rejecting the tunnel can be understood and practiced by one of ordinary skill in the art.

In various embodiments, a network device can remove a given tunnel from configuration when the given tunnel is idle. Removing the tunnel from configuration frees switch resources. A network device can detect when a tunnel is idle by operation of a counter on a per-tunnel basis to keep a count of the number of packets received from each tunnel, as could be determined from information in column 473. If the number of received packets remains constant for a period of time, 30 seconds for example, then the tunnel can be torn-down, i.e., removed from configuration.

In various embodiments, network devices have counters on a per-tunnel basis, to maintain a count of packets that are not sent to a CF, as is indicated in column 474. These counters can allow a network administrator, or the CF device itself, to determine that an anomalous situation has occurred and should be flagged. The count can be stored on a management information base (MIB), which is a standard way of representing information on networking equipment that allows others to read it in a standard format. The MIB can maintain statistics on information including, for example, the number of packets and/or bytes tunneled to and/or from a network device, the number of packets and/or bytes dropped, security information, client identifiers, tunnel identifiers, network device identifiers, and checking functionality identifiers. Identifiers can include assigned numbers, internet protocol (IP) address, and media access controller (MAC) address, among others. Security information can include information for the generation of authentication or encryption information. Logic on a CF can query a MIB to determine when packets have been dropped.

Although the embodiments illustrated in FIGS. 4A and 4B use switches as examples of network devices, embodiments are not so limited. As will be appreciated by one of ordinary skill in the art, other network devices can be used. Furthermore, the embodiments illustrated in FIGS. 4A and 4B, contain examples of information that can be stored in tunnel egress and ingress tables. The reader will appreciate that such tables could contain more or less information than is present in FIGS. 4A and 4B. Embodiments are not limited to the specific examples illustrated herein.

Figure 5A:
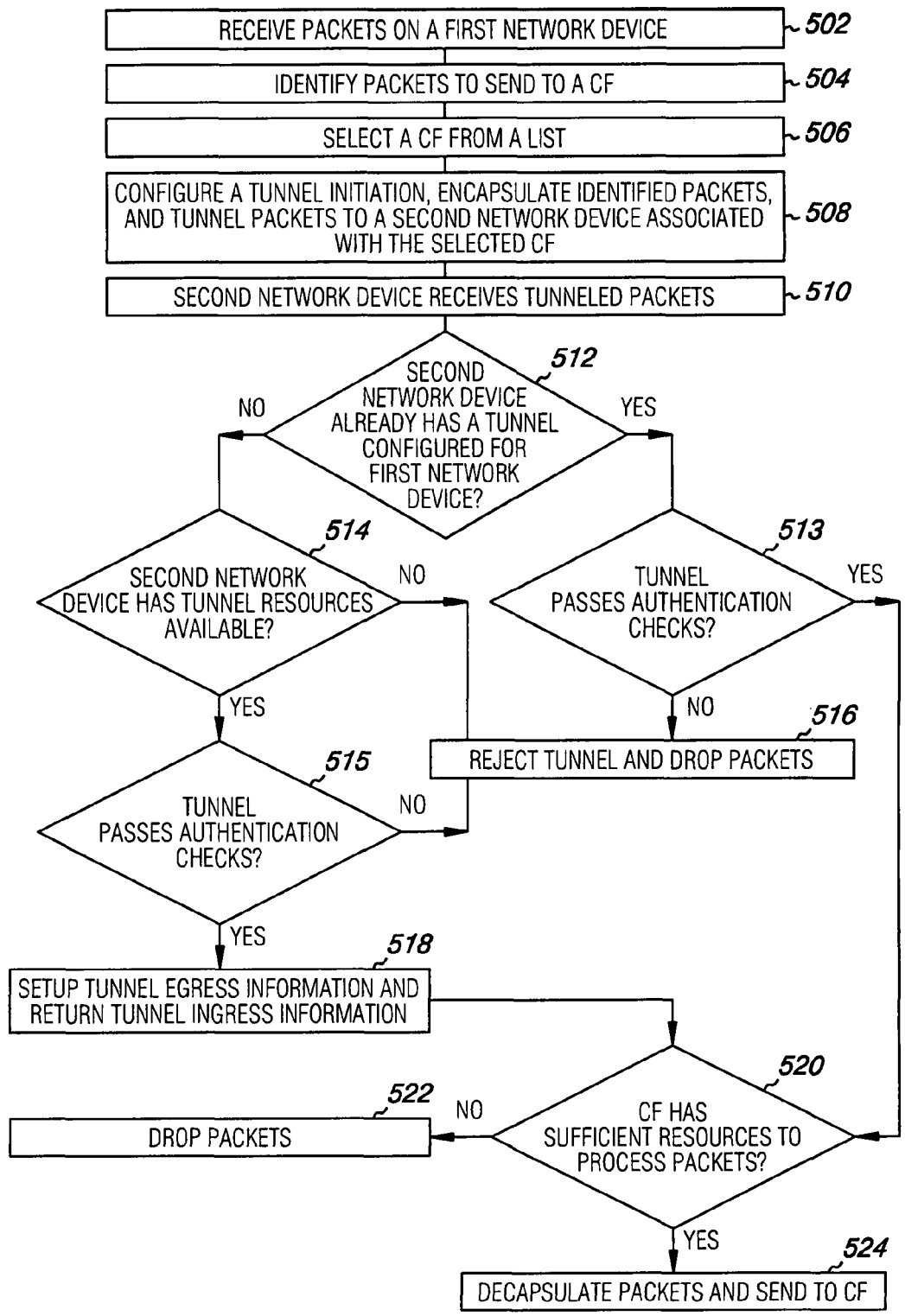
FIG. 5A provides a flow chart illustrating one method for tunnel configuration according to an embodiment of the present invention.

FIG. 5 provides a flow chart illustrating one method for tunnel configuration according to an embodiment of the present invention. A first network device, e.g., a source switch, e.g., 218-S1 in FIG. 2, receives packets at 502. According to embodiments, logic on the first network device identifies, at 504, packets to send to a checking functionality (CF). At 506, logic on the first network device selects a CF, e.g., 250-2 in FIG. 2, from a list, based on a number of criteria, e.g., weight or cost metric, transmitted packet/byte count, security/authorization information, etc. Once a CF has been selected, logic on the first network device configures a tunnel initiation, encapsulates identified packets, and tunnels, at 508, identified packets to a second network device, e.g., 218-D2 in FIG. 2, associated with the selected CF. At 510, the second network device receives tunneled packets. At 512, if the second network device already has a tunnel configured for the first network device, then it determines whether the tunnel passes authentication checks at 513. If the tunnel does not pass authentication checks, then the tunnel is rejected and packets are dropped at 516. If the tunnel does pass authentication checks at 513, then a determination is made as to whether the CF has sufficient resources to process the packets at 520. If the CF does not have sufficient resources, packets are dropped at 522. If the CF has sufficient resources, then the second network device decapsulates the tunneled packets and sends them to the CF at 524.

Returning to element 512, if the second network device does not already have a tunnel configured for the first network device, then a determination is made as to whether the second network device has tunnel resources available at 514. If the second network device does not have available tunnel resources, the tunnel is rejected and the packets are dropped at 516. If the second network device has available tunnel resources, then a determination is made as to whether the tunnel passes authentication checks at 515. If the tunnel does not pass authentication checks, then the tunnel is rejected and packets are dropped at 516. If the tunnel passes authentication checks, then the second network device, at 518, sets up tunnel egress information and return tunnel ingress information, as described in conjunction with FIGS. 4A and 4B above. The particulars of configuring a return tunnel are described in more detail in co-pending, commonly assigned U.S. patent application Ser. No. 11/788,179, entitled "Marked Packet Forwarding," by the same inventors, filed Apr. 19, 2007. Subsequently, if the CF has sufficient resources to process packets at 520, then the second network device decapsulates packets tunneled from the first network device and sends them to the CF at 524. If the CF does not have sufficient resources, then the packets are dropped at 522.

Logic on the second network device could limit which traffic is sent to the CF when the resources of the CF are oversubscribed, i.e., insufficient to process the packets. For example, if the CF can process 4 gigabits per second (Gbit/s) of traffic, but the second network device is receiving 5 Gbit/s of traffic from tunnels that should ordinarily go to the CF, then logic on the second network device would select some traffic and not send it to the CF. In this case all traffic from some clients could be dropped, thereby allowing full throughput for certain clients, and none for others, instead of limiting all clients. Alternatively, logic on the second network device could drop all packets from a number of tunnels when the CF has insufficient resources to process the packets. Furthermore, the CF itself can include logic to reject packets when the CF has insufficient resources to process the packets.

Figure 5B:
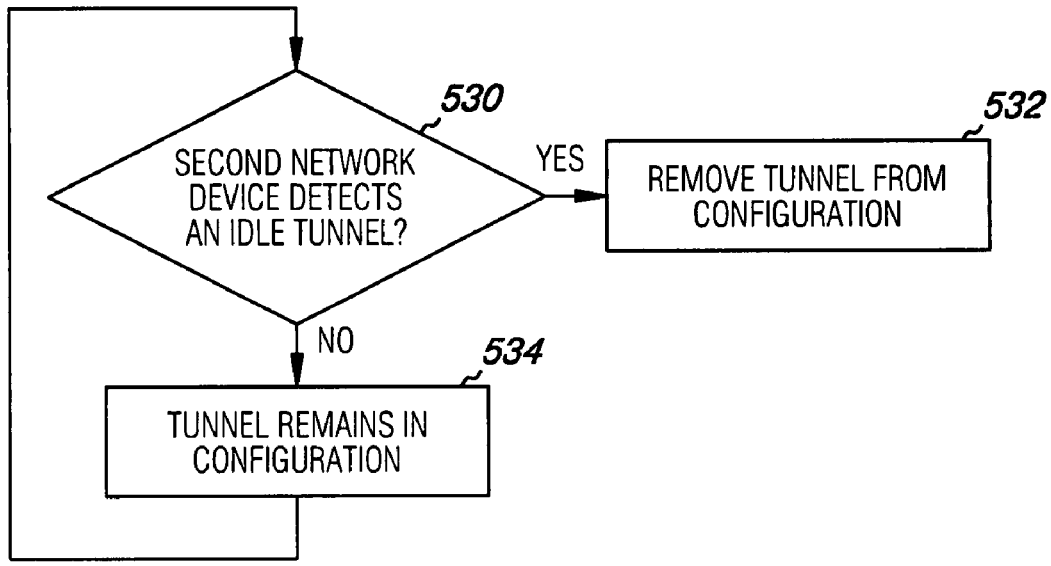
FIG. 5B provides a flow chart illustrating one method for removing an idle tunnel from configuration according to an embodiment of the present invention.

FIG. 5B provides a flow chart illustrating one method for removing an idle tunnel from configuration according to an embodiment of the present invention. As the reader will appreciate, there may be a finite number of tunnels that may be configured in the logic, e.g., ASIC hardware, or by software tracking tunnel bandwidth, associated with the first and second network devices for configuring tunnels between the first and second network devices. Accordingly, in one or more embodiments, the logic can remove an idle tunnel from configuration. Thus, in the example embodiment of FIG. 5B, logic operates to determine if a tunnel is idle according to a particular criteria. For example, if counters on the second network device detect an idle tunnel at 530, e.g., no change in the number of packets received from a first network device for a given tunnel for a period of time, then logic of the second network device can remove that tunnel from configuration at 532. If the tunnel is not idle, then the logic maintains that tunnel's configuration for further packet processing at 534. Logic can be configured to periodically detect, at 530, whether a tunnel is idle. For example, logic on the second network device could be configured to check for idle tunnels every ten seconds. As the reader will appreciate, a ten second period is merely an example and does not limit the scope of this embodiment.

Figure 6:
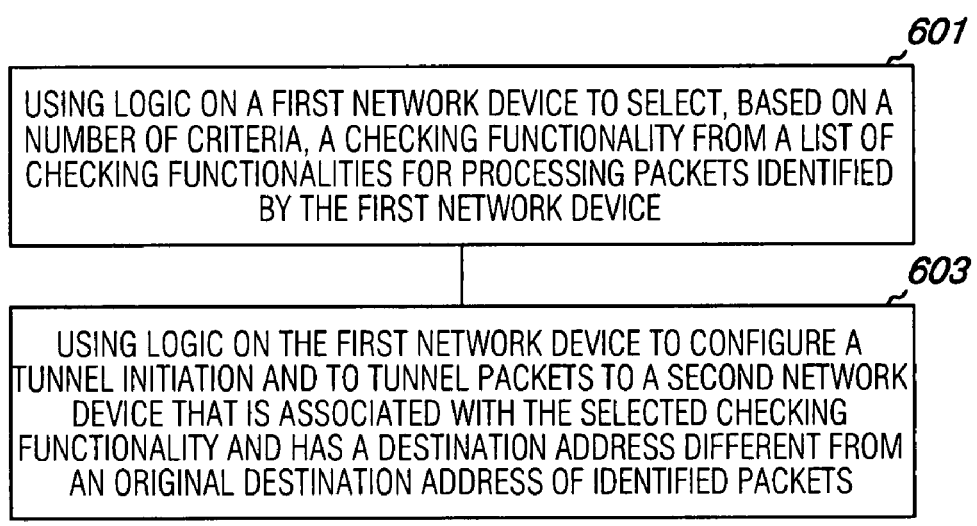
FIG. 6 provides a flow chart illustrating one method for tunnel configuration according to an embodiment of the present invention.

FIG. 6 provides a flow chart illustrating one method for dynamic tunnel configuration according to an embodiment of the present invention. The method includes using logic on a first network device to select, based on a number of criteria, a checking functionality from a list of checking functionalities for processing packets identified by the first network device at 601. At 603, the method also includes using logic on the first network device to configure a tunnel initiation and to tunnel packets to a second network device that is associated with the selected checking functionality and has a destination address different from an original destination address of identified packets. Logic, which is operable to perform the method described in connection with FIG. 6 can be present in whole or in part in embodiments of other figures. Embodiments, however, are not limited to the example given herein.

It is to be understood that the above description has been made in an illustrative fashion, and not a restrictive one. Although specific embodiments have been illustrated and described herein, those of ordinary skill in the art will appreciate that other component arrangements and device logic can be substituted for the specific embodiments shown. The claims are intended to cover such adaptations or variations of embodiments of the present invention, except to the extent limited by the prior art.

In the foregoing Detailed Description, various features are grouped together in a single embodiment for the purpose of streamlining the disclosure. This method of description is not to be interpreted as reflecting an intention that any claim requires more features than are expressly recited in the claim. Rather, as the following claims reflect, inventive subject matter lies in less than all features of a single disclosed embodiment. Thus, the following claims are hereby incorporated into the Detailed Description, with each claim standing on its own as a separate embodiment of the invention.

What is claimed is:

1. A method for processing packets, comprising:
   using logic on a first network device to select, based on a number of criteria, a checking functionality device from a list of checking functionality devices for processing packets identified by the first network device, wherein the number of criteria are selected from the group of:
      weight/cost metric between the first network device and the checking functionality device; and
      order of available checking functionality devices from the list, wherein logic on the first network device cycles through the order, sequentially selecting a checking functionality device for packets tunneled from successive clients; and
   using logic on the first network device to configure a tunnel initiation and to tunnel packets to a second network device that is associated with the selected checking functionality device and has a destination address different from an original destination address of identified packets and is a destination different from an original destination of identified packets.

2. The method of claim 1, wherein the method includes using logic on the second network device to determine whether to configure a tunnel termination and accept tunneled packets based on a number of conditions.

3. The method of claim 2, wherein the method includes using logic on the second network device to determine whether to configure the tunnel termination and accept tunneled packets based on conditions selected from the group of:
   whether a tunnel resource is available to the second network device;
   whether the tunnel passes security checks; and
   whether the tunnel passes authentication checks.

4. The method of claim 1, wherein the method includes using logic on the second network device to remove a given tunnel from configuration between the first and second network devices when a count of a number of packets received from the given tunnel remains constant for a particular time period.

5. The method of claim 1, wherein the method includes using logic on the second network device to determine whether to forward packets to the checking functionality device based on whether the checking functionality device has sufficient resources to process additional packets.

6. The method of claim 5, wherein the method includes using logic on the second network device to drop all packets from a number of clients when the checking functionality device has insufficient resources to process the packets.

7. The method of claim 5, wherein the method includes using logic on the second network device to drop all packets from a number of tunnels when the checking functionality device has insufficient resources to process the packets.

8. The method of claim 1, wherein the method includes using logic on the first network device to tunnel all packets received from a particular client to a same second network device for forwarding to a same checking functionality device.

9. A network device, comprising:
   a network chip including logic, embedded in an application specific integrated circuit, and a number of network ports for the network device for receiving and transmitting packets therefrom, wherein logic can:
      identify packets to send to a checking functionality device; select a checking functionality device from a list based on a number of criteria, wherein the checking functionality device is associated with a separate network device that has a destination address different than an original destination address of identified packets and is a destination different from an original destination of identified packets, wherein the number of criteria are selected from the group of:
         weight/cost metric between the first network device and the checking functionality device; and
         order of available checking functionality devices from the list, wherein logic on the first network device cycles through the order, sequentially selecting a checking functionality device for packets tunneled from successive clients; and
      configure a tunnel initiation and tunnel identified packets to the separate network device.

10. The network device of claim 9, wherein logic tunnels all packets received from a particular client to a same separate network device for forwarding to a same checking functionality device.

11. The network device of claim 9, wherein logic maintains statistics, in a management information base, of information selected from the group of:
   number of packets tunneled to the separate network device;
   number of bytes tunneled to the separate network device;
   security information;
   client identifiers;
   tunnel identifiers;
   separate network device identifiers; and
   checking functionality device identifiers.

12. A network, comprising:
   a first network device having a network chip including logic and a number of network ports for the first network device for receiving and transmitting packets therefrom;
   a second network device, having a network chip including logic and a number of network ports for the second network device for receiving and transmitting packets therefrom; and
   a checking functionality device associated with the second network device;
   wherein logic of the first network device can:
      identify packets to send to the checking functionality;
      select the checking functionality device from a list based on a number of criteria, wherein the checking functionality device is associated with the second network device that has a destination address different than an original destination address of identified packets and is a destination different from an original destination of identified packets, wherein the number of criteria are selected from the group of:
         weight/cost metric between the first network device and the checking functionality device; and
         order of available checking functionality devices from the list, wherein logic on the first network device cycles through the order, sequentially selecting a checking functionality device for packets tunneled from successive clients; and configure a tunnel initiation and tunnel identified packets to the second network device; and wherein logic of the second network device can determine whether to configure a tunnel termination and accept packets tunneled from the first network device based on a number of conditions.

13. The network of claim 12, wherein logic on the second network device can determine whether to configure a tunnel termination and accept packets tunneled from the first network device based on conditions selected from the group of:
   whether a tunnel resource is available to the second network device;
   whether the tunnel passes security checks; and
   whether the tunnel passes authentication checks.

14. The network of claim 12, wherein logic on the second network device can remove a given tunnel from configuration between the first and second network devices when a count of a number of packets received from the given tunnel remains constant for a particular time period.

15. The network of claim 12, wherein logic on the second network device maintains statistics, in a management information base, of information selected from the group of:
   number of packets tunneled from the first network device;
   number of bytes tunneled from the first network device;
   number of packets dropped;
   number of bytes dropped;
   security information;
   tunnel identifiers; and
   first network device identifiers.

16. The network of claim 12, wherein the checking functionality device includes logic to:
   reject packets when the checking functionality device has insufficient resources to process the packets; and
   query a management information base on the second network device to determine when packets have been dropped.

17. The network of claim 12, wherein the checking functionality device is associated with a remediation server and a remediation Virtual Local Area Network (VLAN).

* * * * *